(12) United States Patent
Matsui et al.

(10) Patent No.: US 6,334,977 B1
(45) Date of Patent: Jan. 1, 2002

(54) POWDER MATERIAL FOR POWDER PLASMA OVERLAYING AND POWDER PLASMA OVERLAYING METAL

(75) Inventors: Masakazu Matsui; Akira Notomi; Toshiaki Nishio; Takayuki Maeda; Iwami Ishihara; Tetsuji Yamaguchi, all of Nagasaki; Yoshimi Onitsuka, Tsukui-gun; Yuichi Kojima, Tsukui-gun; Ryoji Miki, Tsukui-gun; Takashi Inami, Fukuoka, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/581,166

(22) PCT Filed: Oct. 12, 1999

(86) PCT No.: PCT/JP99/05615

§ 371 Date: Aug. 21, 2000

§ 102(e) Date: Aug. 21, 2000

(87) PCT Pub. No.: WO00/21711

PCT Pub. Date: Apr. 20, 2000

(30) Foreign Application Priority Data

Oct. 13, 1998 (JP) .......................................... 10-291150

(51) Int. Cl.[7] .............................................. C22C 38/26
(52) U.S. Cl. ............................. 420/70; 420/34; 75/228; 75/246; 75/255
(58) Field of Search .......................... 75/228, 246, 255; 420/70, 34

(56) References Cited

FOREIGN PATENT DOCUMENTS

| JP | 58-141890 A | * | 8/1983 |
| JP | 64-71596 A | * | 3/1989 |
| JP | 10-99990 A | * | 4/1998 |

* cited by examiner

*Primary Examiner*—Deborah Yee
(74) *Attorney, Agent, or Firm*—Oblon, Spivak, McClelland, Maier & Neustadt, P.C.

(57) ABSTRACT

A powder material for powder plasma build-up welding which exhibits excellent resistance and bending properties comprises C in an amount of 0.06 to 0.15% (% by weight, the same hereinafter), Si in an amount of 0.2 to 1.0%, Mn in an amount of 0.2 to 1.0%, Cr in an amount of 17 to 30%, Nb in an amount of 0.6 to 1.5%, Ni in an amount of not more than 0.5%, and the balance consisting of Fe and unavoidable impurities.

10 Claims, 4 Drawing Sheets

THICKNESS REMAINS UNCHANGED

THICKNESS REMAINS UNCHANGED

POWDER MATERIAL FOR POWDER PLASMA OVERLAYING AND POWDER PLASMA OVERLAYING METAL

TECHNICAL FIELD

The present invention relates to powder materials for use in powder plasma build-up welding for the purpose of imparting corrosion resistance and abrasion resistance to furnace pipes, furnace wall panels, or the like, in industrial recovery boilers in paper mills or the like. The present invention also relates to metals formed by powder plasma build-up welding.

BACKGROUND ART

In industrial recovery boilers, a material for build-up welding containing 18% Cr has been used on the surface of members being subjected to build-up welding in a furnace pipe panel, which is a combination of a plurality of carbon steel pipes, in view of corrosion resistance and abrasion resistance under the corrosive environment of smelt at a high temperature. As the build-up material, covered electrodes for shielded arc welding containing 18% Cr and wires for gas-shielded arc welding (hereinafter referred to as "MAG welding wires") containing 18% Cr have been conventionally used.

Figure 1:
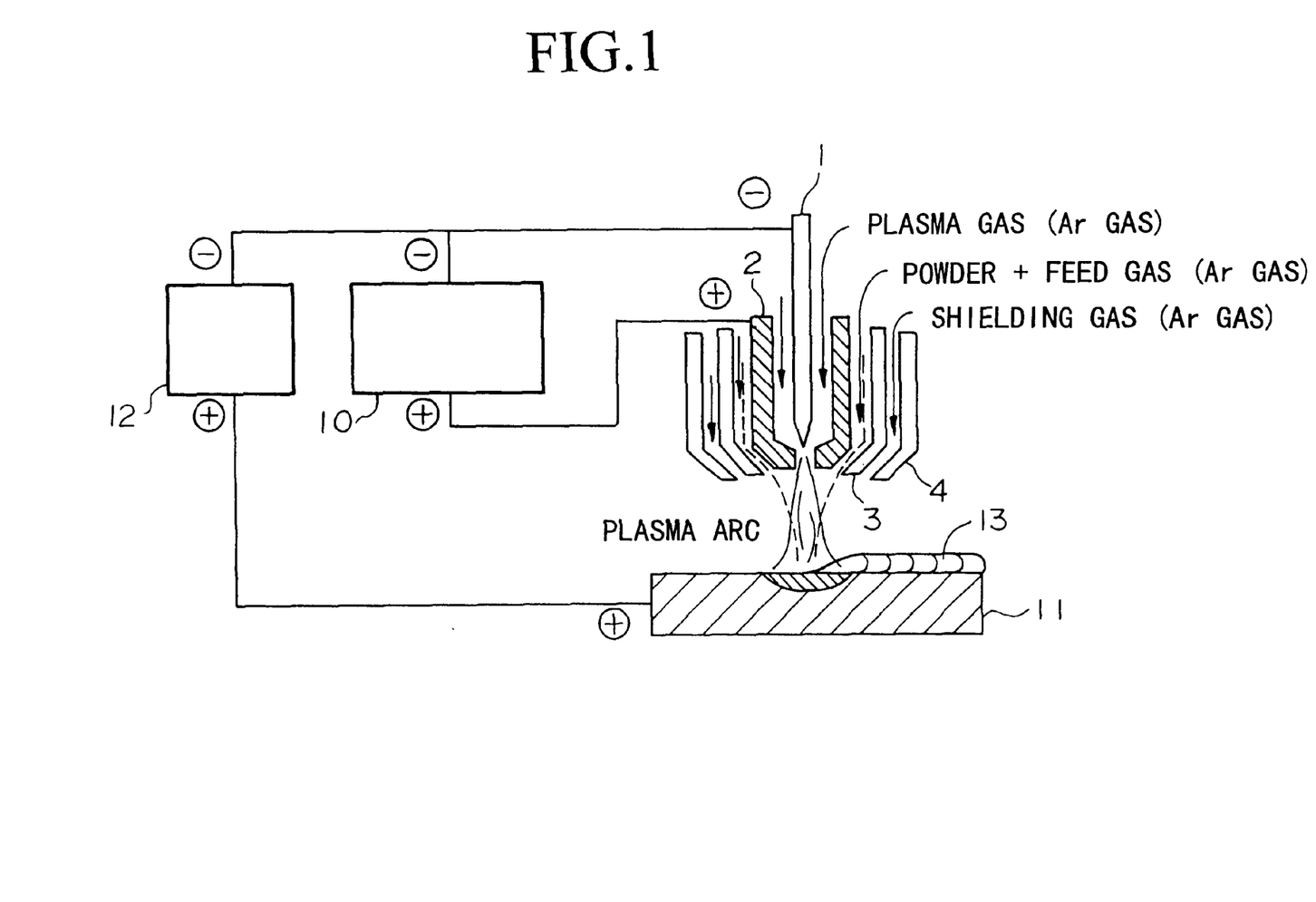
FIG. 1 shows the basic constitution of a device for powder plasma build-up welding.

FIG. 1 shows basic constitution of a conventionally known device for powder plasma build-up welding. A pilot arc power source 10 is connected between a tungsten electrode 1 and a nozzle 2, and a direct current power source 12 is connected between the tungsten electrode 1 and a base metal 11. An intermediate nozzle 3 is disposed outside the nozzle 2, and an outer nozzle 4 is disposed outside the intermediate nozzle 3. Under the conditions in which a plasma gas (for example, Ar gas) is supplied between the tungsten electrode 1 and the nozzle 2, a powder material for build-up welding together with a feed gas (for example, Ar gas) is supplied between the nozzle 2 and the intermediate nozzle 3, and a shielding gas (for example, Ar gas) is supplied between the intermediate nozzle 3 and the outer nozzle 4, a plasma arc is generated between the nozzle and the base metal so that the powder material supplied can be fused, and deposited as a welded metal 13 on the base metal 11.

Figure 2:
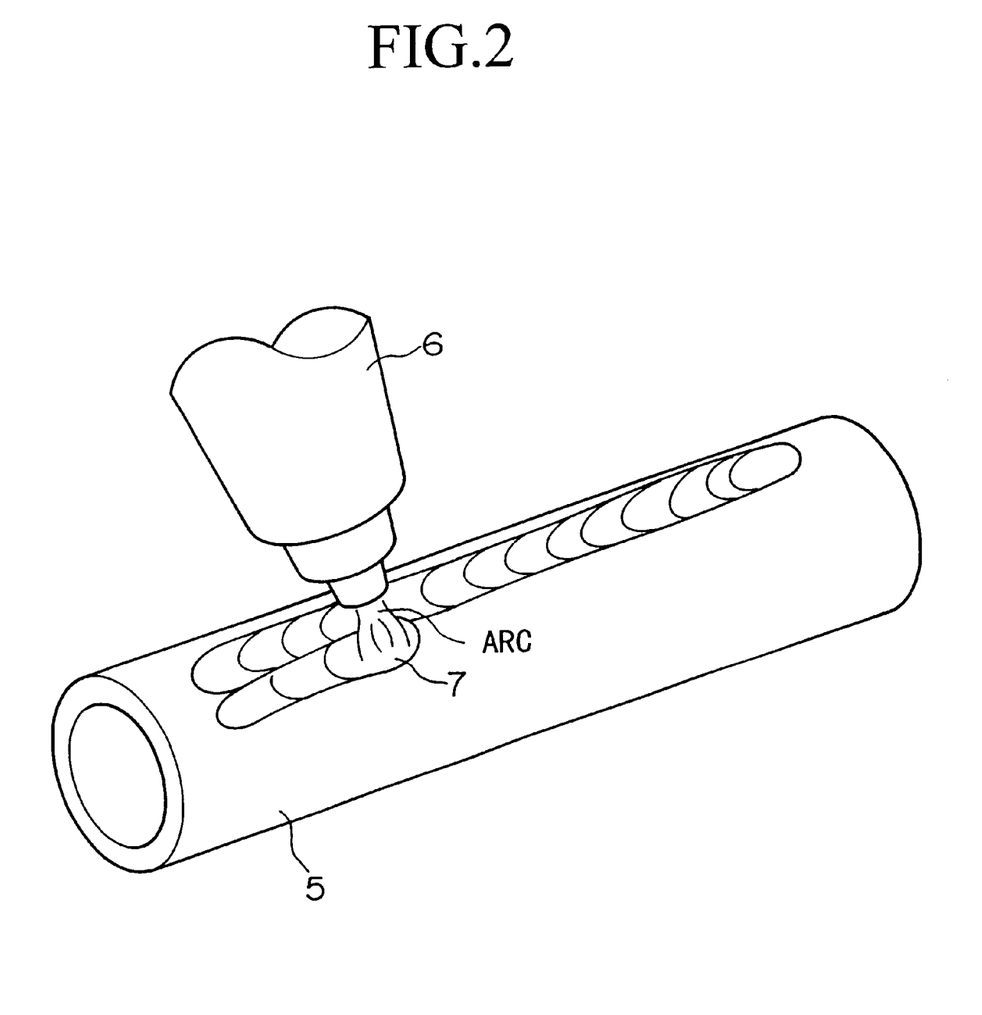
FIG. 2 shows a situation in which powder plasma welding is being performed.

FIG. 2 shows a situation in which powder plasma welding is being performed on a carbon steel pipe. That is, a plasma arc is generated between the carbon steel pipe 5 (for example, JIS STB410) and a plasma welding torch 6 which faces the carbon steel pipe 5, and a powder material supplied is fused in sequence to form a molten pool 7. By gradually moving the plasma welding torch 6, the molten pool 7 is solidified to form a welded metal.

A characteristic of the powder plasma build-up welding is that this method can achieve a maximum amount of deposition of 4 to 6 kg/1 hr in contrast to the shielded arc welding or MAG welding method, which can achieve a maximum amount of deposition of only 3 kg/1 hr. Thus, use of the powder plasma build-up method can realize highly efficient welding.

In addition, since the ratio of dilution with the base metal in the powder plasma build-up welding method is lower than that in present MAG welding methods, the powder plasma build-up method can limit decrease in the amount of Cr in the metal formed by build-up welding. Moreover, the powder plasma build-up method can provide a welded metal of high quality, which does not have welding defects such as blow holes and incomplete fusion.

In recent years, the corrosive environment under which recovery boilers operate has become more severe, as the concentration and the temperature of the materials dealt with therein have become higher. Since severe loss of built-up metal from a furnace pipe occurs in parts of conventionally welded portions having built-up metal of 18% Cr due to corrosion and abrasion by smelt, development of a material for build-up welding which exhibits superior corrosion resistance has been demanded.

It is anticipated that use of powder welding material containing 17 to 30% of Cr for plasma build-up welding will result in a lower rate of loss of built-up metal from furnace pipes due to smelt and a longer life for the furnace pipes.

When welding is performed for a panel which is a combination of a plurality of carbon steel pipes, build-up welding is performed only on the inner side of the furnace wall. Therefore, distortion occurs due to heat input. Accordingly, a stress relieving treatment is carried out on the panel after welding. However, in view of bending stresses due to conveyance and partial processing in the plant, development of welding material has been necessary which has good bending properties when it is untreated after welding in addition to good bending properties after the stress relieving treatment.

DISCLOSURE OF INVENTION

Accordingly, the present invention provides a powder material for powder plasma build-up welding which can exhibit excellent corrosion resistance and bending properties when it is subjected to a powder plasma build-up welding method, which is a highly efficient welding method, in build-up welding for imparting corrosion resistance and abrasion resistance to furnace pipes and furnace wall panels for recovery boilers.

As a result of diligent researches, the present inventors found that a welded metal which is obtained from a powder material for powder plasma build-up welding comprising C in an amount of 0.06 to 0.15%, Si in an amount of 0.2 to 1.0%, Mn in an amount of 0.2 to 1.0%, Cr in an amount of 17 to 30%, Nb in an amount of 0.6 to 1.5%, Ni in an amount of not more than 0.5%, and the balance consisting of Fe and unavoidable impurities has excellent corrosion resistance and bending properties.

According to the present invention, the Cr content is basically 17 to 30%. However, since the amount of corrosive loss of the built-up metal in a recovery boiler varies depending on heat load, conditions of operation, and location within the boiler, a material having a high Cr content (hereinafter occasionally referred to as "25Cr material") can be used where corrosive loss of the built-up metal is severe in consideration of corrosion resistance, while a material having a low Cr content (hereinafter occasionally referred to as "18Cr material") can be used where corrosive loss of the built-up metal is moderate, for the purpose of reducing cost.

That is, 25Cr material is characterized by comprising C in an amount of 0.06 to 0.15%, Si in an amount of 0.2 to 1.0%, Mn in an amount of 0.2 to 1.0%, Cr in an amount of 23 to 30%, Nb in an amount of 0.6 to 1.5%, Ni in an amount of not more than 0.5%, and the balance consisting of Fe and unavoidable impurities, and 18Cr material is characterized by comprising C in an amount of 0.06 to 0.15%, Si in an amount of 0.2 to 1.0%, Mn in an amount of 0.2 to 1.0%, Cr in an amount of 17 to 23%, Nb in an amount of 0.6 to 1.5%, Ni in an amount of not more than 0.5%, and the balance consisting of Fe and unavoidable impurities.

The powder material according to the present invention is not limited to one consisting exclusively of powder of an alloy which has the above composition, and is not particularly limited as long as the powder material is a combination of metal powder and alloy powder which finally provides the above composition, such as a mixture of metal powders of each constituent element and a mixture of alloy powders each of which consists of a plurality of elements. The powder material of the present invention may normally be prepared with a grain size of approximately 63 to 500 μm for powder plasma build-up welding, however, this grain size is not a limitation of the present invention.

BEST MODE FOR CARRYING OUT THE INVENTION

The chemical composition of the powder material for the present invention and the reasons for defining the chemical composition are described below.

C is an indispensable element for having the crystal grains of the welded metal fine by forming a carbide such as NbC and TiC. The C content is determined to be not less than 0.06% since the strength of the welded metal would be poor if the C content is less than 0.06%. On the other hand, the C content is determined to be not more than 0.15% since too much C causes the welded metal structure to be extremely rigid. A preferable range of C is 0.06 to 0.12%

Si is an element which is included for deoxidation. If the Si content is less than 0.2%, the deoxidation effect is insufficient. On the other hand, it is necessary that the Si content be an amount of not more than 1.0% since too much Si would degrade the toughness of the deposited metal. A preferable range of Si is 0.3 to 0.8%.

Mn is an element which is effective in deoxidation, securing strength, and improvement in toughness. However, the deoxidation effect would be insufficient if the Mn content is less than 0.2%. Alternatively, the Mn content must be an amount of not more than 1.0% since too much Mn would result in causing the structure to be rigid and a decrease in toughness. A preferable range of Mn is 0.3 to 0.8%.

Cr is a fundamental component for securing corrosion resistance and high temperature strength. As mentioned above, although an allowable amount of Cr according to the present invention is in the range of 17 to 30%, a 25Cr material, which contains Cr in an amount in the range of 23 to 30%, is preferably used where corrosive loss of the built-up metal is relatively severe, whereas a 18Cr material, which contains Cr in an amount in the range of 17 to 23%, is preferably used where corrosive loss of the built-up metal is relatively moderate also taking the cost and the ratio of dilution with the base metal into account.

In the 25Cr material, since an increase in the Cr content exceeding 27% does not give a corresponding increase in corrosion resistance, a Cr content of 23–27% is preferable. In addition, in the 18Cr material, a maximum Cr content of 20% is preferable when concerns about cost are greater.

Ni as well as C and Mn is an element which forms austenite. When Cr is in an amount in the range of 17 to 30%, excessive addition of Ni causes martensite structure and causes the structure to be rigid, with which suitable bending properties cannot be obtained. Accordingly, the Ni content is determined to be not more than 0.5%.

Nb combines with C to form a fine and stable precipitate (carbide), which allows the size of the crystal grains of the welded metal to be as fine as 100 μm. Since the crystal grains are formed finely, suitable bending properties and toughness can be obtained. Where the ratio of Nb to C is 8 to 10 (Nb/C=8 to 10), the amount of Nb corresponding to the amount of C in the range of 0.06 to 0.15% is 0.48 to 1.5%. However, when Nb is less than 0.6%, the crystal grains of the welding material cannot be formed finely, and good bending properties and toughness cannot be obtained. In addition, if Nb is added in an amount of not less than 1.5%, most of C will be precipitated as carbides, the amount of C in the welded metal will decrease, and the strength of the welded metal will be poor. In addition, the excess of the Nb that does not combine with C remains in the welded metal, and this excessive Nb obstructs the bending properties. Furthermore, Nb relates to welding workability (such as the flowability of the molten metal in a molten pool and the stability of the arc) and addition of Nb in an amount exceeding 1.5% would considerably degrade the welding stability.

Based on the above reasons, the Nb content is determined to be 0.6 to 1.5%. A preferable Nb content is 0.7 to 1.3%.

The above material according to the present invention may contain Al or Ti or both, in which the amount of Al is 0.03 to 0.15%, and the amount of Ti is 0.08 to 0.18%.

Al contributes as a deoxidizer and contributes with Nb to making the crystal grains fine. However, Al in an amount less than 0.03% would make the crystal grains of the welded metal bulky and unable to obtain good bending properties. On the other hand, Al in an amount exceeding 0.15% would increase slag in the molten pool, which degrades flowability of the molten metal and causes welding workability to deteriorate. Accordingly, the Al content is determined to be 0.03 to 0.15%.

In a manner similar to Al, Ti acts as a deoxidizer, and contributes with Nb to making the crystal grains fine. However, Ti in an amount less than 0.08% would make the crystal grains of the welded metal bulky and would make it impossible to obtain good bending properties. On the other hand, Ti in an amount exceeding 0.18% would increase the amount of slag in the molten pool, which degrades the flowability of the molten metal and causes welding workability to deteriorate. Accordingly, the Ti content is determined to be 0.08 to 0.18%.

As shown in the Examples which are described below, the effects from Al and Ti will be more apparent if they are added together. Accordingly, addition of Al and Ti together is preferable to addition of one of them.

A welded metal obtained using the above powder material for powder plasma build-up welding according to the present invention comprises C in an amount of 0.06 to 0.15%, Si in an amount of 0.2 to 1.0%, Mn in an amount of 0.2 to 1.0%, Cr in an amount of 17 to 30%, Nb in an amount of 0.6 to 1.5%, Ni in an amount of not more than 0.5% by weight, and the balance consisting of Fe and unavoidable impurities, and the metal having a crystal grain size not larger than 100 μm, and thus the welded metal has excellent corrosion resistance and bending properties.

EXAMPLES

The present invention will be described in the following using Examples. In the following Examples, alloy powder materials having various chemical compositions were used in powder plasma welding on carbon steel pipes (material: STB410; outer diameter: φ63.5 mm; pipe thickness: 6.3 mm) having the chemical composition shown in Table 1, and welding workability after build-up welding and face-bend test (bending properties) were evaluated. The alloy powder material was obtained by the gas atomization method.

TABLE 1

|  | C | Si | Mn | P | S | Cr | Ni | Nb | Al | Ti | Note |
|---|---|---|---|---|---|---|---|---|---|---|---|
| Carbon steel pipe STB410 | 0.21 | 0.19 | 0.63 | 0.01 | 0.002 | — | — | — | — | — | ϕ63.5 × 6.3t Fe Bal. (% by weight) |

TABLE 2

| Welding current (A) | Welding speed (mm/min) | Ar gas flow rate (l/min) | | | Powder feed amount (kg/hr) |
|---|---|---|---|---|---|
| | | Plasma gas | Carrier gas | Shielding gas | |
| 400 | 300 | 2 | 5 | 23 | 5 |

For the welding workability, each of arc stability, the shape of bead, separatability of slag, and occurrence of spatter were evaluated, and according to overall judgement, if the welding workability was good, o was assigned, whereas if it was not good, x was assigned.

Figure 3:
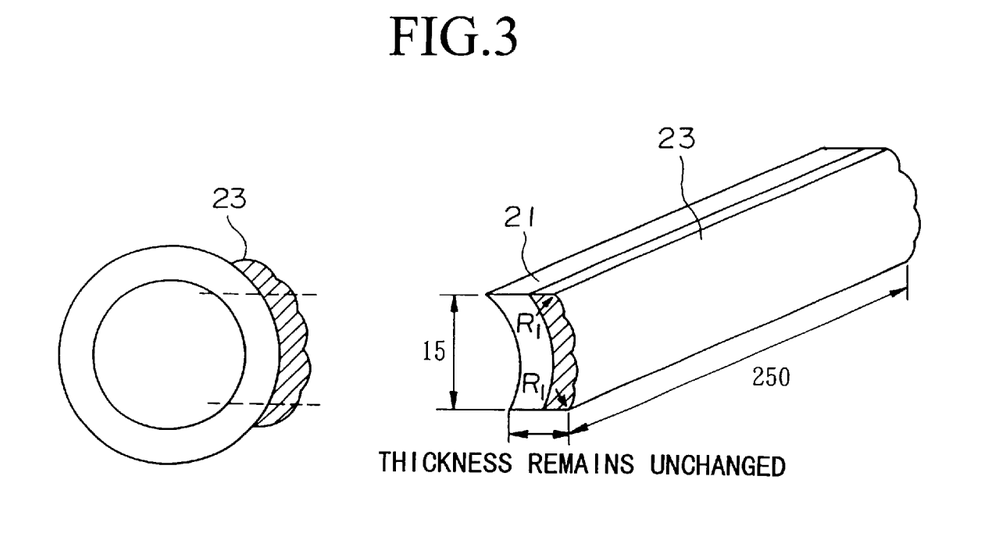
FIG. 3 shows the shape of a face-bend test piece used in the Examples of the present invention.
Figure 4:
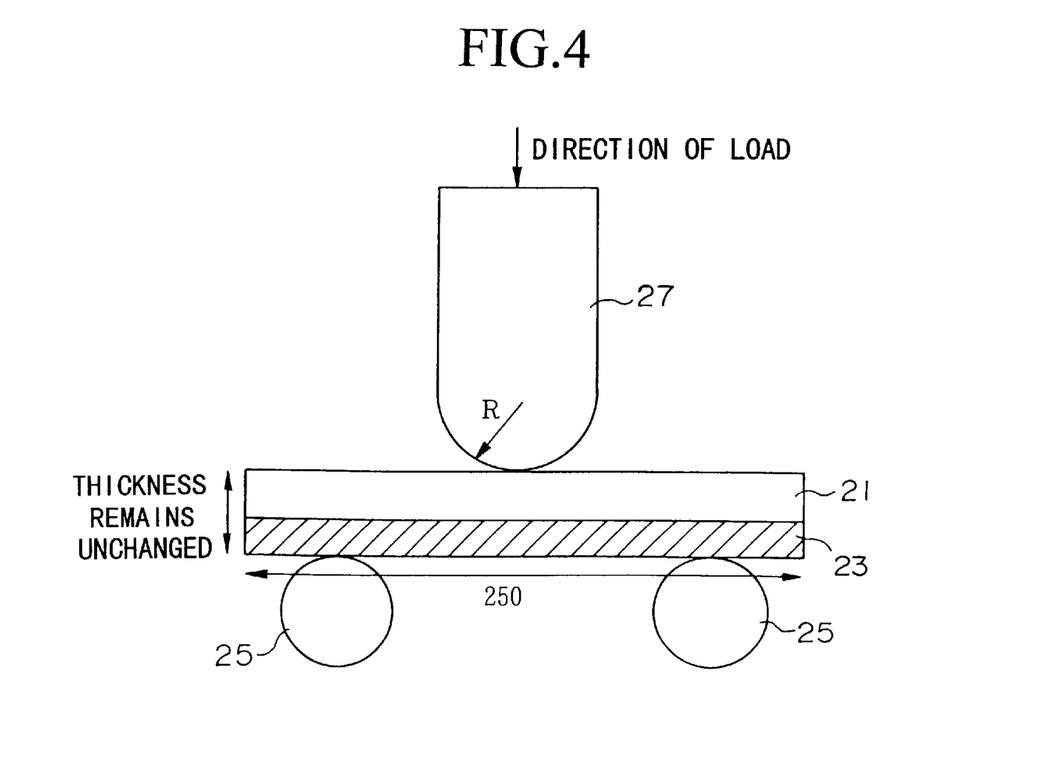
FIG. 4 shows the procedure of the face-bend test which was conducted in the Examples of the present invention.

A test piece having the shape as shown in FIG. 3 was cut out, and a face-bend test was conducted as shown in FIG. 4 in line with the "Method of Bending Test for Metal Materials" according to JIS Z 2248, in which the welded metal was on the side which is stretched. In FIGS. 3 and 4, numeral 21 indicates the base metal, numeral 23 indicates the metal formed by build-up welding, numeral 25 indicates a fulcrum, and numeral 27 indicates a presser metal. The test was conducted under the condition that D=2R+4t (in which D is distance between the fulcra, R is radius of the tip of the presser metal, and t is the thickness). Here, a bending angle of 60° or greater for a test piece which is untreated after welding is judged acceptable in view of thermal stresses after welding, bending stresses during conveyance of the furnace pipe panel, and the bending process of the panel for the bottom of the furnace.

Example 1

Powder plasma build-up welding was conducted according to the above using an alloy powder material (grain size: 63 to 500 μm) having the chemical composition shown in Table 3. Evaluation and test results for each test sample are also shown in Table 3.

TABLE 3

| | Test sample No. | Chemical components of powder material (% by weight) | | | | | | Evaluation of weldability | Face-bending angle (°) | Note |
|---|---|---|---|---|---|---|---|---|---|---|
| | | C | Si | Mn | Cr | Ni | Nb | | | |
| Example | 1-1 | 0.07 | 0.44 | 0.41 | 17.2 | 0.15 | 0.89 | o | 130 | |
| | 1-2 | 0.09 | 0.55 | 0.39 | 17.9 | 0.23 | 1.02 | o | 150 | |
| | 1-3 | 0.08 | 0.51 | 0.34 | 18.8 | 0.13 | 0.90 | o | 120 | |
| | 1-4 | 0.12 | 0.48 | 0.52 | 19.1 | 0.42 | 0.91 | o | 95 | |
| | 1-5 | 0.10 | 0.55 | 0.42 | 19.6 | 0.35 | 0.94 | o | 100 | |
| Comparative Example | 1-6 | 0.17 | 0.42 | 0.65 | 19.4 | 0.25 | 1.22 | o | 15 | |
| | 1-7 | 0.07 | 1.40 | 0.45 | 18.9 | 0.21 | 0.85 | × | 45 | |
| | 1-8 | 0.09 | 0.62 | 1.51 | 17.8 | 0.25 | 1.12 | × | 50 | |
| | 1-9 | 0.11 | 0.55 | 0.55 | 16.7 | 0.24 | 0.92 | o | 150 | Low corrosion resistance |
| | 1-10 | 0.07 | 0.54 | 0.34 | 18.2 | 0.9 | 0.93 | o | 55 | |
| | 1-11 | 0.08 | 0.42 | 0.48 | 18.9 | 4.2 | 0.82 | o | 15 | |
| | 1-12 | 0.12 | 0.39 | 0.6 | 18.9 | 0.25 | 0.42 | × | 20 | |
| | 1-13 | 0.08 | 0.42 | 0.62 | 18.5 | 0.25 | 1.70 | × | 45 | |
| | 1-14 | 0.07 | 0.09 | 1.58 | 18.9 | 8.9 | — | — | — | SUS304 comparative base metal |
| | 1-15 | 0.06 | 0.50 | 0.45 | 18.7 | <0.1 | 0.1 | — | — | 18Cr welding material |

• Chemical component Fe bal.
• Good weldability: o ; poor weldability ×
• In the face-bend test, 60° or greater is judged acceptable.

Test samples Nos. 1-1 to 1-5 in Table 3 are examples which meet the requirements defined by the present invention, and they showed good results with respect to both welding workability and bending properties. In contrast, test samples Nos. 1-6 to 1-13 are comparative examples which fail to meet one of the requirements of the present invention. Test sample No. 1-14 is a comparative base metal of SUS304, which was used in a corrosion test as described below. In test sample No. 1-15, a conventional 18Cr build-up material (all metal components deposited using a MAG welding wire) was used.

Test sample No. 1-6, in which the C content was 0.17%, exceeding the upper limit according to the present invention, had a welded metal structure which was markedly rigid and exhibited poor bending properties.

Test sample No. 1-7, in which the Si content was 1.40%, exceeding the upper limit according to the present invention, had its toughness degraded and exhibited poor bending properties.

Test sample No. 1-8, in which the Mn content was 1.51%, exceeding the upper limit according to the present invention, had a welded metal structure which was rigid and had its toughness degraded, and as a result exhibited poor bending properties.

formed by build-up welding decreased due to dilution with the base metals, and thus the Cr contents in test samples Nos. 1-1 and 1-3 were 14.6% and 16.0%, respectively. Test sample No. 1-15, in which a conventional 18Cr build-up material was used, had a dilution ratio higher than that according to the powder plasma build-up welding method, since it is formed by the MAG welding method. The Cr content in the single-layer metal formed by build-up welding in test sample No. 1-15 was 14.0%.

TABLE 4

| | Test sample No. | Percentage of Cr in single-layer metal formed by build-up welding | Amount of built-up metal lost due to corrosion (mg/cm$^2$) | Note |
|---|---|---|---|---|
| Example | 1-1 | 14.6 | 5.1 | Dilution Ratio 15.0% |
| | 1-3 | 16.0 | 4.0 | Dilution Ratio 14.5% |
| Comparative Example | 1-14 | (18.9) | 2.4 | SUS304 comparative base metal |
| | 1-15 | 14.0 | 5.5 | 18Cr welding material; Dilution Ratio 25% |

Number in ( ) indicates percentage of Cr in plate.

Test sample No. 1-9 showed satisfactory results with regard to welding workability and bending properties. However, since test sample No. 1-9 had a low Cr content, it did not possess desirable corrosion resistance in the corrosion test described below.

Test samples Nos. 1-10 and 1-11, in which the Ni contents exceeded the upper limit according to the present invention, had a welded metal structure which was markedly rigid and did not exhibit good bending properties.

Test sample No. 1-12, in which the Nb content was 0.42%, which is less than the lower limit according to the present invention, had bulky crystal grains and did not possess good bending properties. In contrast, test sample No. 1-13, in which the Nb content was 1.70%, exceeding the upper limit according to the present invention, produced a large amount of fumes, and its welding workability was degraded markedly.

Figure 5:
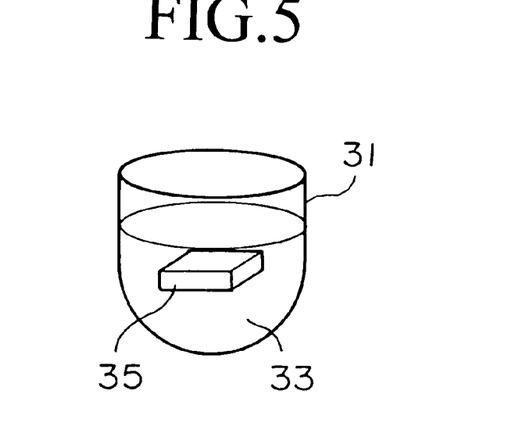
FIG. 5 shows the conditions of the corrosion test which was conducted in Example of the present invention.
Figure 6:
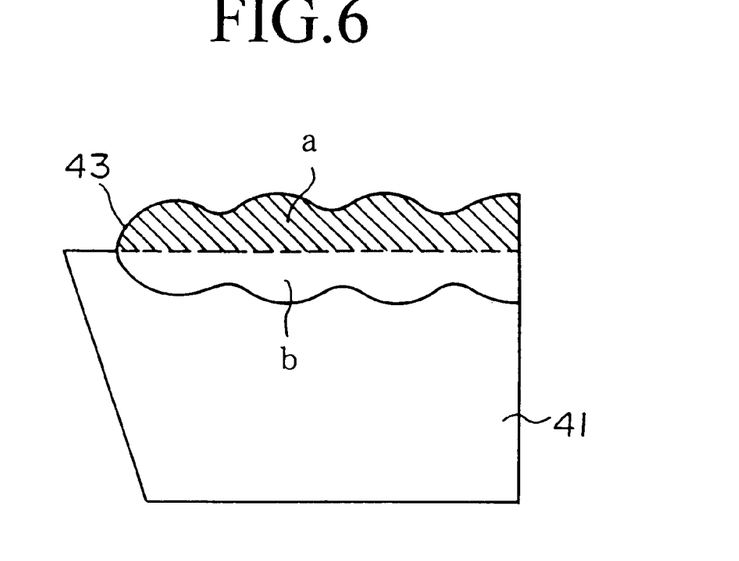
FIG. 6 shows how the dilution ratio between a test sample and a base metal was obtained.

A corrosion test and dilution ratio evaluation were conducted for the above test samples Nos. 1-1, 1-3, 1-14, and 1-15. In the corrosion test, a test sample 35 was immersed in crushed smelt 33 inside a crucible 31 as shown in FIG. 5, a test gas (1% $SO_2$–2% $O_2$–15% $CO_2$–$N_2$ bal) at 400° C. was run through the crushed smelt 33 for 100 hours, and thereafter the amount of corrosive loss of the built-up metal was measured. As the ash applied to the test sample 35 in the corrosion test, smelt collected from an actual machine was used. The dilution ratio was obtained by the following formula, in which the dilution ratio is the ratio of area b to the sum of area a and area b, area a being the area of the welded metal 43 on the base metal 41 while area b is the area of the welded metal 43 which is diffused in the base metal 41 in the cross section of the test sample as shown in FIG. 6.

$$\text{Dilution ratio } n(\%) = \frac{b}{a+b} \times 100$$

The results of the corrosion tests and dilution ratios are shown in Table 4. The Cr contents in the single-layer metals The amounts of corrosive loss of the built-up metals in test samples Nos. 1-1 and 1-3, in which the materials according to the present invention were used, display their corrosion resistance as nearly equivalent to those of conventional 18Cr welding materials.

Since it has been ascertained that the amount of corrosive loss of the built-up metal depends only on the Cr content, and that variation of the amount of the other elements does not change the amount of corrosive loss of the built-up metal, the addition of Al and Ti, which were used in some of the following Examples, is not considered to change the corrosion resistance.

As shown above, the present invention provides an excellent powder plasma build-up welding material which did not conventionally exist. As a result, the present invention can result in high efficiency in carrying out build-up welding for furnace evaporation pipes in recovery boilers and can make it possible to perform build-up welding of high quality, for which the dilution ratio is lower than that of conventional MAG welding methods. Accordingly, the present invention can retard loss of built-up metal from furnace pipes due to smelt and can achieve a longer life for the furnace pipes.

Example 2

Powder plasma build-up welding was conducted using an alloy powder material (grain size: 63 to 500 μm) having the chemical composition shown in Table 5. Evaluation and test results for each test sample are also shown in Table 5.

Test samples Nos. 2-1 to 2-5 in Table 5 are examples which meet the requirements defined by the present invention, and they showed good results with respect to both welding workability and bending properties. In contrast, test sample No. 2-6, in which the Al content was less than the lower limit according to the present invention, had markedly bulky crystal grains and did not have good bending properties. Test sample No. 2-7, which had an Al content exceeding the upper limit, showed poor flowability of molten metal in the molten pool, and thus the welding workability was poor.

TABLE 5

| Test sample | | No. | Chemical components of powder material (% by weight) | | | | | | | Evaluation of weldability | Face-bending angle (°) | Note |
|---|---|---|---|---|---|---|---|---|---|---|---|---|
| | | | C | Si | Mn | Cr | Ni | Nb | Al | | | |
| Example | | 2-1 | 0.07 | 0.44 | 0.41 | 17.7 | 0.15 | 1.05 | 0.07 | o | 130 | |
| | | 2-2 | 0.09 | 0.55 | 0.39 | 18.2 | 0.42 | 0.89 | 0.12 | o | 150 | |
| | | 2-3 | 0.08 | 0.51 | 0.34 | 18.9 | 0.13 | 0.90 | 0.04 | o | 120 | |
| | | 2-4 | 0.12 | 0.48 | 0.44 | 19.1 | 0.18 | 1.05 | 0.12 | o | 95 | |
| | | 2-5 | 0.10 | 0.65 | 0.52 | 19.5 | 0.40 | 1.05 | 0.09 | o | 100 | |
| Comparative Example | | 2-6 | 0.11 | 0.54 | 0.53 | 18.5 | 0.15 | 0.85 | 0.22 | × | 45 | |

• Chemical component Fe bal.
• Good weldability: o ; poor weldability ×
• In the face-bend test, 60° or greater is judged acceptable.

Example 3

Powder plasma build-up welding was conducted using an alloy powder material (grain size: 63 to 500 μm) having the chemical composition shown in Table 6. Evaluation and test results for each test sample are also shown in Table 6.

Test samples Nos. 3-1 to 3-5 in Table 6 are examples which meet the requirements defined by the present invention, and they showed good results with respect to both welding workability and bending properties. In contrast, test sample No. 3-6, in which the Ti content exceeds the upper limit, produced a large amount of slag and showed poor flowability of molten metal in the molten pool, and thus the welding workability was poor.

TABLE 6

| Test sample | | No. | Chemical components of powder material (% by weight) | | | | | | | Evaluation of weldability | Face-bending angle (°) | Note |
|---|---|---|---|---|---|---|---|---|---|---|---|---|
| | | | C | Si | Mn | Cr | Ni | Nb | Al | | | |
| Example | | 3-1 | 0.07 | 0.44 | 0.41 | 17.6 | 0.15 | 1.05 | 0.10 | o | 130 | |
| | | 3-2 | 0.09 | 0.55 | 0.39 | 18.1 | 0.42 | 0.89 | 0.11 | o | 150 | |
| | | 3-3 | 0.08 | 0.51 | 0.34 | 18.9 | 0.13 | 0.90 | 0.13 | o | 120 | |
| | | 3-4 | 0.12 | 0.48 | 0.57 | 19.2 | 0.18 | 1.05 | 0.15 | o | 95 | |
| | | 3-5 | 0.10 | 0.65 | 0.62 | 19.4 | 0.40 | 1.05 | 0.10 | o | 100 | |
| Comparative Example | | 3-6 | 0.10 | 0.39 | 0.62 | 19.4 | 0.11 | 1.12 | 0.23 | × | 45 | |

• Chemical component Fe bal.
• Good weldability: o ; poor weldability ×
• In the face-bend test, 60° or greater is judged acceptable.

Example 4

Powder plasma build-up welding was conducted using an alloy powder material (grain size: 63 to 500μm) having the chemical composition shown in Table 7. Evaluation and test results for each test sample are also shown in Table 7.

Test samples Nos. 4-1 to 4-5 in Table 7 are examples which meet the requirements defined by the present invention, and all of them showed a face-bending angle of 180°, which indicates an excellent bending property.

TABLE 7

| Test sample | | No. | Chemical components of powder material (% by weight) | | | | | | | | Evaluation of weldability | Face-bending angle (°) | Note |
|---|---|---|---|---|---|---|---|---|---|---|---|---|---|
| | | | C | Si | Mn | Cr | Ni | Nb | Al | Ti | | | |
| Example | | 4-1 | 0.07 | 0.44 | 0.41 | 17.6 | 0.15 | 1.05 | 0.07 | 0.10 | o | 180 | |
| | | 4-2 | 0.09 | 0.55 | 0.39 | 18.1 | 0.42 | 0.89 | 0.12 | 0.11 | o | 150 | |
| | | 4-3 | 0.08 | 0.51 | 0.34 | 18.9 | 0.13 | 0.90 | 0.04 | 0.13 | o | 180 | |
| | | 4-4 | 0.12 | 0.48 | 0.57 | 19.2 | 0.18 | 1.05 | 0.12 | 0.15 | o | 180 | |
| | | 4-5 | 0.10 | 0.65 | 0.62 | 19.4 | 0.40 | 1.05 | 0.09 | 0.10 | o | 180 | |

TABLE 7-continued

| Test sample | | Chemical components of powder material (% by weight) | | | | | | | | Evaluation of weldability | Face-bending angle (°) | Note |
|---|---|---|---|---|---|---|---|---|---|---|---|---|
| | No. | C | Si | Mn | Cr | Ni | Nb | Al | Ti | | | |
| Comparative Example | 4-6 | 0.11 | 0.54 | 0.53 | 18.5 | 0.15 | 0.85 | 0.25 | 0.12 | × | 60 | |
| | 4-7 | 0.10 | 0.39 | 0.52 | 19.4 | 0.11 | 1.12 | 0.08 | 0.24 | × | 70 | |

• Chemical component Fe bal.
• Good weldability: ○ ; poor weldability ×
• In the face-bend test, 60° or greater is judged acceptable.

Comparison of Example 4 with Example 2 (in which only Al was added) and Example 3 (in which only Ti was added) shows that the addition of Al and Ti together will result in a better bending angle in the face-bend test compared with the addition of either one of them alone.

Test sample No. 4-6, which had an Al content exceeding the upper limit, showed poor flowability of molten metal in the molten pool, and thus the welding workability was poor. Test sample No. 4-8, which had a Ti content exceeding the upper limit, produced a large amount of slag and showed poor flowability of molten metal in the molten pool, and thus the welding workability was poor.

Example 5

Powder plasma build-up welding was conducted using an alloy powder material (grain size: 63 to 500 μm) having the chemical composition shown in Table 8. Evaluation and test results for each test sample are also shown in Table 8. In addition, for some test samples, the corrosion test and the dilution ratio evaluation were conducted in a manner similar to Example 1.

Test samples Nos. 5-1 to 5-5 in Table 8 are examples which meet the requirements defined by the present invention, and they showed good results with respect to both welding workability and bending properties. In contrast, test samples Nos. 5-6 to 5-13 are comparative examples which fail to meet one of the requirements of the present invention. Test sample No. 5-14 is a comparative base metal of SUS310, which was used in the corrosion test. Test sample No. 5-15 is a comparative base metal of SUS304. In test sample No. 5-16, a conventional 18Cr build-up material (all metal components deposited using a MAG welding wire) was used.

TABLE 8

| Test sample | | Chemical components of powder material (% by weight) | | | | | | Evaluation of weldability | Face-bending angle (°) | Note |
|---|---|---|---|---|---|---|---|---|---|---|
| | No. | C | Si | Mn | Cr | Ni | Nb | | | |
| Example | 5-1 | 0.07 | 0.45 | 0.58 | 23.2 | 0.25 | 0.82 | ○ | 95 | |
| | 5-2 | 0.09 | 0.30 | 0.21 | 24.0 | 0.12 | 0.90 | ○ | 120 | |
| | 5-3 | 0.10 | 0.3 | 0.21 | 24.9 | 0.18 | 1.05 | ○ | 130 | |
| | 5-4 | 0.11 | 0.55 | 0.39 | 25.4 | 0.40 | 0.89 | ○ | 110 | |
| | 5-5 | 0.15 | 0.43 | 0.35 | 26.8 | 0.25 | 0.95 | ○ | 85 | |
| Comparative Example | 5-6 | 0.18 | 0.42 | 0.65 | 25.3 | 0.25 | 1.22 | ○ | 30 | |
| | 5-7 | 0.07 | 1.20 | 0.45 | 24.3 | 0.21 | 0.85 | × | 40 | |
| | 5-8 | 0.09 | 0.62 | 1.12 | 25.1 | 0.25 | 1.12 | × | 45 | |
| | 5-9 | 0.11 | 0.54 | 0.75 | 31.1 | 0.25 | 0.85 | × | 15 | |
| | 5-10 | 0.07 | 0.54 | 0.55 | 24.1 | 0.90 | 0.93 | ○ | 15 | |
| | 5-11 | 0.10 | 0.49 | 0.53 | 25.8 | 4.1 | 0.85 | ○ | 10 | |
| | 5-12 | 0.12 | 0.39 | 0.56 | 26.3 | 0.25 | 0.50 | ○ | 50 | |
| | 5-13 | 0.08 | 0.42 | 0.62 | 26.2 | 0.25 | 1.80 | × | 35 | |
| Conventional Material | 5-14 | 0.05 | 0.96 | 1.81 | 24.4 | 19.9 | — | — | — | SUS310S comparative base metal |
| | 5-15 | 0.07 | 0.09 | 1.58 | 18.9 | 8.9 | — | — | — | SUS304 comparative base metal |
| | 5-16 | 0.06 | 0.50 | 0.45 | 18.7 | <0.1 | 0.1 | — | — | 18Cr welding material |

• Chemical component Fe bal.
• Good weldability: ○ ; poor weldability ×
• In the face-bend test, 60° or greater is judged acceptable.

The results of the corrosion tests are shown in Table 9. The Cr contents in the single-layer metals formed by build-up welding decreased due to dilution with the base metals, and thus the Cr contents in the single-layer metals formed by build-up welding in test samples Nos. 5-1 and 5-3 were 21.2% and 22.0%, respectively.

Table 9 shows that the corrosion resistance of the single-layer metals formed by build-up welding in test samples Nos. 5-1 and 5-3, in which the materials according to the present invention were used, was nearly equivalent to that of conventional 18Cr welding materials, and that test sample No. 5-16 had corrosion resistance superior to that of welded metals formed from conventional 18Cr welding materials.

TABLE 9

| Test sample No. | Percentage of Cr in single-layer metal formed by build-up welding | Amount of built-up metal lost due to corrosion (mg/cm$^2$) | Note |
|---|---|---|---|
| Example 5-1 | 21.2 | 1.8 | Dilution Ratio 11.7% |
| 5-3 | 22.0 | 1.7 | Dilution Ratio 12.6% |
| Comparative Example 5-14 | (24.4) | 1.5 | SUS310S comparative base metal |
| 5-15 | (18.9) | 2.4 | SUS304 comparative base metal |
| 5-16 | 13.5 | 6.8 | 18Cr welding material |

Number in ( ) indicates percentage of Cr in plate.

Since it has been ascertained that the amount of corrosive loss of the built-up metal depends only on the Cr content, and that variation of the amount of the other elements does not change the amount of corrosive loss of the built-up metal, the addition of Al and Ti, which were used in some of the following Examples, is not considered to change the corrosion resistance.

As shown above, the present invention provides an excellent powder plasma build-up welding material which did not previously exist. As a result, the present invention can result in high efficiency in carrying out build-up welding for furnace evaporation pipes in recovery boilers and can make it possible to perform build-up welding of high quality, for which the dilution ratio is lower than that of conventional MAG welding methods. In addition, since the present invention provides corrosion resistance superior to that of current 18Cr build-up materials, the present invention can retard loss of built-up metal from furnace pipes due to smelt and can achieve a longer life for the furnace pipes.

Example 6

Powder plasma build-up welding was conducted using an alloy powder material (grain size: 63 to 500 µm) having the chemical composition shown in Table 10. Evaluation and test results for each test sample are also shown in Table 10.

Test samples Nos. 6-1 to 6-5 in Table 10 are examples which meet the requirements defined by the present invention, and they showed good results with respect to both welding workability and bending properties. Test sample No. 6-6 which had an Al content exceeding the upper limit, showed poor flowability of molten metal in the molten pool, and thus the welding workability was poor.

TABLE 10

| Test sample No. | Chemical components of powder material (% by weight) | | | | | | | Evaluation of weldability | Face-bending angle (°) | Note |
|---|---|---|---|---|---|---|---|---|---|---|
| | C | Si | Mn | Cr | Ni | Nb | Al | | | |
| Example 6-1 | 0.07 | 0.45 | 0.58 | 23.2 | 0.25 | 0.83 | 0.05 | ○ | 150 | |
| 6-2 | 0.09 | 0.31 | 0.21 | 24.0 | 0.12 | 0.90 | 0.07 | ○ | 180 | |
| 6-3 | 0.11 | 0.35 | 0.42 | 24.9 | 0.18 | 1.05 | 0.06 | ○ | 180 | |
| 6-4 | 0.10 | 0.55 | 0.40 | 25.4 | 0.40 | 0.88 | 0.11 | ○ | 120 | |
| 6-5 | 0.14 | 0.43 | 0.35 | 26.8 | 0.25 | 0.95 | 0.09 | ○ | 150 | |
| Comparative Example 6-6 | 0.10 | 0.49 | 0.53 | 25.3 | 0.18 | 1.02 | 0.21 | × | 30 | |

• Chemical component Fe bal.
• Good weldability: ○ ; poor weldability ×
• In the face-bend test, 60° or greater is judged acceptable.

Example 7

Powder plasma build-up welding was conducted using an alloy powder material (grain size: 63 to 500 µm) having the chemical composition shown in Table 11. Evaluation and test results for each test sample are also shown in Table 11.

Test samples Nos. 7-1 to 7-5 in Table 11 are examples which meet the requirements defined by the present invention, and they showed good results with respect to both welding workability and bending properties. In contrast, test sample No. 7-6, in which the Ti content exceeds the upper limit, produced a large amount of slag and showed poor flowability of molten metal in the molten pool, and thus the welding workability was poor.

TABLE 11

|  | Test sample No. | Chemical components of powder material (% by weight) | | | | | | | Evaluation of weldability | Face-bending angle (°) | Note |
|---|---|---|---|---|---|---|---|---|---|---|---|
|  |  | C | Si | Mn | Cr | Ni | Nb | Al |  |  |  |
| Example | 7-1 | 0.07 | 0.45 | 0.55 | 23.2 | 0.25 | 0.82 | 0.05 | ○ | 120 |  |
|  | 7-2 | 0.09 | 0.30 | 0.21 | 24.0 | 0.12 | 0.90 | 0.07 | ○ | 150 |  |
|  | 7-3 | 0.10 | 0.41 | 0.26 | 24.5 | 0.16 | 1.05 | 0.15 | ○ | 180 |  |
|  | 7-4 | 0.10 | 0.55 | 0.42 | 25.4 | 0.40 | 0.89 | 0.08 | ○ | 120 |  |
|  | 7-5 | 0.15 | 0.43 | 0.35 | 26.8 | 0.25 | 0.95 | 0.09 | ○ | 150 |  |
| Comparative Example | 7-6 | 0.10 | 0.49 | 0.53 | 25.3 | 0.18 | 1.02 | 0.23 | × | 45 |  |

• Chemical component Fe bal.
• Good weldability: ○ ; poor weldability ×
• In the face-bend test, 60° or greater is judged acceptable.

Example 8

Powder plasma build-up welding was conducted using an alloy powder material (grain size: 63 to 500 μm) having the chemical composition shown in Table 12. Evaluation and test results for each test sample are also shown in Table 12.

Test samples Nos. 8-1 to 8-5 in Table 12 are examples which meet the requirements defined by the present invention, and all of them showed a face-bending angle of 180°, which indicates an excellent bending property.

TABLE 12

|  | Test sample No. | Chemical components of powder material (% by weight) | | | | | | | | Evaluation of weldability | Face-bending angle (°) | Note |
|---|---|---|---|---|---|---|---|---|---|---|---|---|
|  |  | C | Si | Mn | Cr | Ni | Nb | Al | Ti |  |  |  |
| Example | 8-1 | 0.07 | 0.45 | 0.58 | 23.2 | 0.25 | 0.82 | 0.05 | 0.08 | ○ | 180 |  |
|  | 8-2 | 0.09 | 0.30 | 0.21 | 24.0 | 0.12 | 0.90 | 0.06 | 0.07 | ○ | 180 |  |
|  | 8-3 | 0.09 | 0.46 | 0.22 | 24.4 | 0.11 | 0.90 | 0.07 | 0.12 | ○ | 180 |  |
|  | 8-4 | 0.12 | 0.46 | 0.22 | 25.2 | 0.39 | 0.89 | 0.08 | 0.08 | ○ | 180 |  |
|  | 8-5 | 0.15 | 0.43 | 0.35 | 26.8 | 0.25 | 0.95 | 0.11 | 0.09 | ○ | 180 |  |
| Comparative Example | 8-6 | 0.10 | 0.49 | 0.53 | 25.3 | 0.18 | 1.02 | 0.23 | 0.12 | × | 42 |  |
|  | 8-7 | 0.08 | 0.41 | 0.25 | 26.2 | 0.25 | 0.85 | 0.07 | 0.23 | × | 15 |  |

• Chemical component Fe bal.
• Good weldability: ○ ; poor weldability ×
• In the face-bend test, 60° or greater is judged acceptable.

Comparison of Example 8 with Example 6 (in which only Al was added) and Example 7 (in which only Ti was added) shows that the addition of Al and Ti together will result in a better bending angle in the face-bend test compared with the addition of either one of them alone.

Test sample No. 8-6, which had an Al content exceeding the upper limit, showed poor flowability of molten metal in the molten pool, and thus the welding workability was poor. Test sample No. 8-7, which had a Ti content exceeding the upper limit, produced a large amount of slag and showed poor flowability of molten metal in the molten pool, and thus the welding workability was poor.

Industrial Applicability

As described above, the present invention can provide a metal formed by powder plasma build-up welding which possesses excellent corrosion resistance and bending properties.

What is claimed is:

1. A powder material for powder plasma build-up welding comprising C in an amount of 0.06 to 0.15% by weight, Si in an amount of 0.2 to 1.0% by weight, Mn in an amount of 0.2 to 1.0% by weight, Cr in an amount of 17 to 30% by weight, Nb in an amount of 0.6 to 1.5% by weight, Ni in an amount of not more than 0.5% by weight, and the balance consisting of Fe and unavoidable impurities.

2. A powder material for plasma build-up welding according to claim 1, wherein the amount of Cr is 17 to 23% by weight.

3. A powder material for powder plasma build-up welding according to claim 2, which comprises Al in an amount of 0.03 to 0.15% by weight.

4. A powder material for powder plasma build-up welding according to claim 2, which comprises Ti in an amount of 0.08 to 0.18% by weight.

5. A powder material for powder plasma build-up welding according to claim 2, which comprises Al in an amount of 0.03 to 0.15% by weight and Ti in an amount of 0.08 to 0.18% by weight.

6. A powder material for plasma build-up welding according to claim 1, wherein the amount of Cr is 23 to 30% by weight.

7. A powder material for powder plasma build-up welding according to claim 6, which comprises Al in an amount of 0.03 to 0.15% by weight.

8. A powder material for powder plasma build-up welding according to claim 6, which comprises Ti in an amount of 0.08 to 0.18% by weight.

9. A powder material for powder plasma build-up welding according to claim 6, which comprises Al in an amount of 0.03 to 0.15% by weight and Ti in an amount of 0.08 to 0.18% by weight.

10. A metal formed by a powder plasma build-up welding comprising C in an amount of 0.06 to 0.15% by weight, Si in an amount of 0.2 to 1.0% by weight, Mn in an amount of 0.2 to 1.0% by weight, Cr in an amount of 17 to 30% by weight, Nb in an amount of 0.6 to 1.5% by weight, Ni in an amount of not more than 0.5% by weight, Al in an amount of 0.03 to 0.15% by weight, Ti in an amount of 0.08 to 0.18% by weight, and the balance consisting of Fe and unavoidable impurities, and the metal having a crystal grain size not larger than 100 $\mu$m.

* * * * *